United States Patent
Rychlak

(10) Patent No.: US 6,366,849 B1
(45) Date of Patent: Apr. 2, 2002

(54) METHOD OF NAVIGATING OF AND A NAVIGATION SYSTEM FOR A MOVING MEANS

(75) Inventor: Stefan Rychlak, Ilsede (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/595,105

(22) Filed: Jun. 16, 2000

(30) Foreign Application Priority Data

Jun. 17, 1999 (DE) .......................................... 199 27 640

(51) Int. Cl.$^7$ ............................................ G08G 1/0968
(52) U.S. Cl. ...................... 701/202; 701/208; 701/213; 340/990; 340/991
(58) Field of Search ................................. 701/202, 208, 701/209, 213; 340/988, 990, 995, 991

(56) References Cited

U.S. PATENT DOCUMENTS

| | | | |
|---|---|---|---|
| 5,862,509 A | * | 1/1999 | Desai et al. ................. 701/202 |
| 5,987,381 A | * | 11/1999 | Oshizawa .................... 701/202 |
| 6,006,161 A | * | 12/1999 | Katou ......................... 701/208 |
| 6,125,326 A | * | 9/2000 | Ohmara et al. ............. 701/202 |
| 6,182,006 B1 | * | 1/2001 | Meek .......................... 701/208 |

FOREIGN PATENT DOCUMENTS

| | | | | |
|---|---|---|---|---|
| DE | 41 39 581 A1 | | 6/1993 | |
| DE | 197 30 411 A1 | | 1/1999 | |
| GB | 20 79 453 | * | 1/1982 | ................. 701/202 |

\* cited by examiner

*Primary Examiner*—Richard M. Camby
(74) *Attorney, Agent, or Firm*—Michael J. Striker

(57) ABSTRACT

A moving object, in particular a vehicle, a motor vehicle, a ship and an airplane, is navigated from an initial point to a destination point by providing a destination guiding device; guiding the moving object along a preliminarily calculated route from an initial point to a destination point by means of the destination guiding device; before boarding the moving object, inputting at least one destination point in a data processing device which is external to the moving object, calculating in the external data processing device at least one route, and transmitting corresponding route data through a transmission line to the destination guiding device.

14 Claims, 1 Drawing Sheet

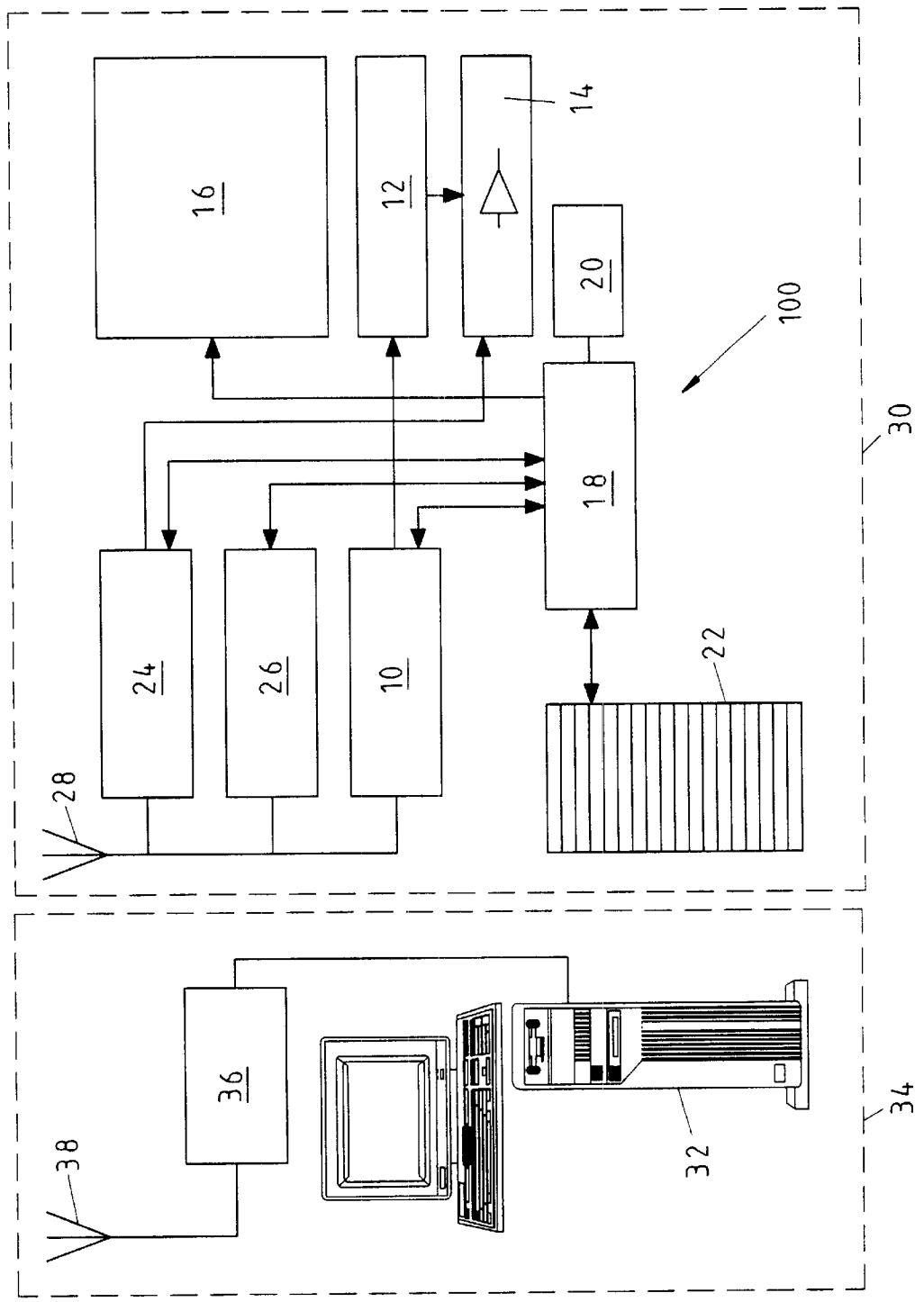

METHOD OF NAVIGATING OF AND A NAVIGATION SYSTEM FOR A MOVING MEANS

BACKGROUND OF THE INVENTION

The present invention relates to a method of navigating a moving means, in particular a vehicle, a motor vehicle, a ship or an airplane for navigation from an initial point to a point of destination, with a destination guiding device provided in the moving means for guiding the same along a computed route from the initial point to the destination point.

The invention also relates to a navigation system for a moving means, in particular for a vehicle, a motor vehicle, a ship or an airplane.

In moving means such as for example motor vehicles, airplanes or ships, fixedly installed navigation systems guide a driver of the moving means, in a fast, simple and reliable way from an actual standing point to a desired destination point, without a complicated planning by the driver of the moving means in advance and a corresponding map material. For this purpose the corresponding navigation data, such as for example based on maps, land maps or street maps, are stored in the navigation system for example on CD-ROM. The navigation device uses in particular GPS (Global Positioning System) to determine an instantaneous standing point and to calculate the corresponding navigation instructions which lead to a predetermined destination. The navigation data contain preferably data about streets and paths for a motor vehicle.

Before the navigation system takes its objective and can calculate a route from the standing point to the destination point, it is however necessary that the user inputs the desired destination point and in some cases, in the navigation devices without GPS, also the actual standing point. This is performed for example through a manually operated input device. Letters of a character table are inquired or scrolled one after the other and selected until the selected letters and numerals, for example for a location name, a street name, or a house number of a destination point or the standing point. This is however complicated and time consuming and requires certain basic knowledge by the operator of the navigation system.

SUMMARY OF THE INVENTION

Accordingly, it is an object of present invention to provide an improved method of navigating and a navigating system of the above mentioned general type, which avoid the disadvantages of the prior art and can be operated in a simple and comfortable manner.

In keeping with these objects and with others which will become apparent hereinafter, one feature of present invention resides, briefly stated in a method of navigating a movable means, in accordance with which before boarding a movable means, at least one destination point is inputted into one data processing device which is for example external to the moving means, at least one route is calculated in the external data processing device, and corresponding route data are transmitted through a transmission line to the destination guiding device.

When the method is performed in accordance with the present invention, it has the advantage that the input of the data or options relevant for the route computation is performed substantially in a more comfortable and simple manner at a home desk or in the office, for example a personal computer, and in the destination guiding device all necessary preparations for a destination guidance are completed when a user, for example a car driver, boards the moving means, for example a motor vehicle. This is especially advantageous in winter, since the driver must not be involved in programming in a cold vehicle of its navigation system for navigation, but instead must start driving. Furthermore, due to the higher storage capacity of the external data processing device, it is possible to introduce substantially more and flexible as well as actual information of the calculated route, such as for example information about hotels, gasoline sources, etc. For shipping enterprises, already in the office the logistics of cost and time saving routes can be calculated and transmitted to the out-of-office vehicles, so that an accurate and simple planning and use of a navigation system is possible.

An expansion of the information for the driver of the moving means is obtained when in accordance with the present invention, additional information, for example about the computed routes, are read from a memory of the external data processing device, and transmitted with the route data to the moving means.

Preferably, in addition the initial point is inputted in the external data processing device. This is especially advantageous when the instantaneous processing device or the moving means is not the desired initial point for the route computation. Thereby other routes can be computed in the device and submitted to the destination guiding device.

For accurate initialization of the destination guidance, after the transmission of the route to the destination guiding device, from it the initial point is determined as an instantaneous standing point of the moving means. This is performed for example by a GPS detection (GPS is Global Positioning System), which provides an additional higher accuracy when compared with the manually inputted point into the data processing device.

Preferably, a transmission line can be formed as an infrared or radio connection and the external data processing device can use a personal computer. In accordance with the present invention, also a navigation system is proposed, in which an interface is provided for wireless connection with a local data processing device located in the region of parking of the moving means, for transmission of route data from the data processing device to the navigation system.

This has the advantage that the input of the relevant data or options for the route computation is performed more comfortable and simpler at a home desk or in the office, for example with a personal computer, while in the destination guiding device all required preparations are completed for a destination guidance when a user, for example a car driver, boards the moving means, for example a motor vehicle.

This is especially advantageous in winter, since the driver for navigation must not do programming in a cold car on its navigation system, but instead can start driving. Further, because of the high capacity of the external data processing device, it is possible to introduce substantially more and flexible or actual information in the calculated route, such as for example information about hotels, gasoline stations, etc. In shipping enterprises, in the office the logistic of cost and time-minimal routes are calculated and transmitted to the out-of-office vehicles, so that an accurate and comfortable planning and use of a navigation system is possible. In accordance with a preferable embodiment, the interface is formed as an infrared or radio connection, for example an HF-connection with 433 MHz and the local data processing device is a personal computer.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single figure of the drawings is a view showing a schematic block diagram of a preferable embodiment of a navigation system in accordance with the present invention.

DESCRIPTION OF PREFERRED EMBODIMENTS

A navigation system in accordance with the present invention is shown in its first embodiment in the drawings and identified with reference numeral 100. It includes a destination guiding device 10 provided with an acoustic street guide 12 via a loud speaker unit 14, an indicating device 16 formed for example for "Destination point: city, street", a microprocessor 18 with a user interface in form of a keyboard 20, a route storage 22, a radio receiving device 24 which is also connected with the loud speaker unit 14, a transmitting/receiving unit 26, and an antenna 28 which is connected with the radio receiving device 24, the transmitting/receiving unit 26, and the destination guiding device 10. The above mentioned components are located in a motor vehicle which is identified with reference numeral 30 and illustrated with broken lines.

The transmitting/receiving unit 26 is formed as a data transmitting interface, which can provide a wireless connection to an external personal computer 32 of a user located in the vicinity of a parking point of the motor vehicle 30. It is located for example in a house or an office of the user, which is shown in broken lines 34. It also has a transmitting/receiving unit 36 with the antenna 38. By means of the transmitting/receiving unit 26 and 36, a local radio connection, for example in the range of 433 MHz in 70 cm band is provided between the vehicle 30 and the personal computer 32.

In accordance with the present invention, the user has the possibility, prior to boarding the motor vehicle 30, to sit comfortably at his personal computer 32, and to determine a destination point and corresponding options, such as for example "Shortest path", "Fastest path", "only country road", etc., and to calculate a route by the personal computer 32. As long as it is performed satisfactory, the corresponding route data are transmitted through the radio connection by means of the transmitting/receiving units 26, 36 to the navigation system 100 and stored in the route memory 22.

The user can selectively calculate only the instantaneous travel planned by him to a single destination point and store it, or also simultaneously several routes. They are then sequentially stored in the route memory 22, for example in the form:

route 1, destination point 1,
route 2, destination point 2,
route 3, destination point 3,
route 4, destination point 4,
. . .
route n, destination point n, to be available in the motor vehicle 30 for selection.

In this way all preparations and required programming for a destination guidance are completed by the navigation system 100, before the user finally leaves his office or house 34 and boards the motor vehicle 30 for starting the travel. As a result the long programming in the motor vehicle is dispensed with, which usually in winter before the start of traveling and therefore heating the vehicle, is found to be very uncomfortable.

Since conventionally the driver wants to provide a route calculation from the point where the personal computer is located, namely from his house or office 32, the standing point of the personal computer is determined preferably as the initial point for the route calculation and therefore must not be inputted every time. When however a route is to be calculated from an initial point which is different from the standing point of the personal computer, then the initial point each time can be changed later on.

After the transmission of the route data, it is advantageous to determine the exact standing point of the motor vehicle 30, for example by means of a satellite-supported location (GPS), so that the destination guide can be optimally initialized.

Since the personal computer contains a sizeable memory medium, additional information of the route, for example hotels, gasoline stations, storage locations, etc. can be introduced, and transmitted with the route data.

When the motor vehicle is parked within a visible contact with the personal computer 32, the transmitting/receiving units 26, 36 can be formed as an infrared interface.

It will be understood that each of the elements described above, or two or more together, may also find a useful application in other types of constructions differing from the types described above.

While the invention has been illustrated and described as embodied in method of navigating of a navigation system for a moving means, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of navigating a movable means selected from the group consisting of a vehicle, a motor vehicle, a ship and an airplane, from an initial point to a destination point, comprising the steps of providing a moving means with a destination guiding device; guiding the moving means along a preliminarily calculated route from an initial point to a destination point by means of the destination guiding device; before boarding the moving means, inputting at least one destination point in a data processing device which is external to the moving means, calculating in the external data processing device at least one route, transmitting corresponding route data through a transmission line to the destination guiding device, and performing the transmitting of the route data via a direct communication connection between the external data processing device and the destination guiding device of the moving means.

2. A method as defined in claim 1; and further comprising reading from a storage of the external data processing device additional information related to the calculated route; and transmitting the additional information with the route data to the moving means.

3. A method as defined in claim 1; and further comprising additionally inputting the initial point into the external data processing device.

4. A method as defined in claim 1; and further comprising determining the initial point as a momentary standing point of the moving means, after the transmission of the route to the destination guiding device.

5. A method as defined in claim 4; and further comprising performing the determination of the initial point by means of a satellite-supported location, in a global positioning system.

6. A method as defined in claim 1; and further comprising using an infrared connection as the transmission line.

7. A method as defined in claim 1; and further comprising using a radio connection as the transmission line.

8. A method as defined in claim 1; and further comprising using an input unit as the external data processing device.

9. A method as defined in claim 8; and further comprising using a personal computer as the input unit.

10. A navigation system for a moving means selected from the group consisting of a vehicle, a motor vehicle, a ship and an airplane, the navigation system comprising a data processing device located in a region of the parked moving means; navigating means; and an interface for wireless connection with said data processing device for transmission of route data from said data processing device to said navigating mean, said interface being formed so as to perform the transmission of route data via a direct communication connection between said data processing device which is external to said moving means on the one hand and a destination guiding device of said moving means on the other hand.

11. A navigation system as defined in claim 10, wherein said interface is an infrared connection.

12. A navigation system as defined in claim 10, wherein said interface is a radio connection.

13. A navigation system as defined in claim 12, wherein said radio connection is an HF-connection with 433 MHz.

14. A navigation system as defined in claim 10, wherein said data processing device is a personal computer.

\* \* \* \* \*